United States Patent
Bogachek et al.

(10) Patent No.: US 11,644,151 B2
(45) Date of Patent: May 9, 2023

(54) VESSEL MADE OF THERMALLY NON-HARDENABLE ALUMINUM ALLOY AND METHOD FOR THE PRODUCTION THEREOF

(71) Applicant: Oleg Evgenievich Bogachek, Saint Petersburg (RU)

(72) Inventors: Oleg Evgenievich Bogachek, Saint Petersburg (RU); Alexander Mikhaylovich Drits, Saint Petersburg (RU)

(73) Assignee: Oleg Evgenievich Bogachek, Saint Petersburg (RU)

( * ) Notice: Subject to any disclaimer, the term of this patent is extended or adjusted under 35 U.S.C. 154(b) by 659 days.

(21) Appl. No.: 16/486,270

(22) PCT Filed: Feb. 8, 2018

(86) PCT No.: PCT/RU2018/050010
§ 371 (c)(1),
(2) Date: Aug. 15, 2019

(87) PCT Pub. No.: WO2018/151630
PCT Pub. Date: Aug. 23, 2018

(65) Prior Publication Data
US 2021/0239271 A1      Aug. 5, 2021

(30) Foreign Application Priority Data
Feb. 15, 2017 (EA) .................................. 201700164

(51) Int. Cl.
*F17C 1/14* (2006.01)
*B23K 101/12* (2006.01)
*B23K 20/12* (2006.01)

(52) U.S. Cl.
CPC .............. *F17C 1/14* (2013.01); *B23K 20/122* (2013.01); *B23K 2101/12* (2018.08);
(Continued)

(58) Field of Classification Search
CPC ..... B23K 20/122; B23K 2101/12; F17C 1/14; F17C 2203/0646; F17C 2203/0648;
(Continued)

(56) References Cited

U.S. PATENT DOCUMENTS

| | | |
|---|---|---|
| 2008/0277036 A1 | 11/2008 | Johansen |
| 2009/0127271 A1 | 5/2009 | Muraoka |
| 2011/0052932 A1 | 3/2011 | Pandey |
| 2014/0027023 A1 | 1/2014 | Johansen |
| 2015/0316210 A1 | 11/2015 | Nakai et al. |

FOREIGN PATENT DOCUMENTS

| | | |
|---|---|---|
| AU | 2015202303 A1 | 11/2016 |
| CN | 1148679 A | 4/1997 |

(Continued)

*Primary Examiner* — Stephen J Castellano
(74) *Attorney, Agent, or Firm* — Adam Warwick Bell; Matthew Kaser

(57) ABSTRACT

The present invention relates to metalworking, in particular to producing vessels from non-heat-treatable aluminium alloys used for tanks and pressure vessels. Disclosed is a method of manufacturing a vessel, the method including: forming a tube by rolling at least one flat blank and abutting the edges thereof, friction stir welding the abutted edges and working at least a part of the welded tube into a shape of the vessel, wherein the flat blank is a sheet of a non-heat-treatable aluminium alloy preliminarily subjected to cold working with permanent deformation within the range of 0.5-15%, and said working of at least one part of the welded tube is hot working at a temperature of 230-520° C. The technical effect is a reduction in vessel weight, an increase in vessel strength, a uniform vessel strength and a reduction in the number of hot working cycles during manufacturing of the vessel. Further, the method provides reduced metal and time consumption in manufacturing a vessel from a (Continued)

non-heat-treatable aluminium alloy, low payload ratio, increased reliability and longer service life of the vessel produced using the method.

12 Claims, 1 Drawing Sheet

(52) U.S. Cl.
CPC .................. *F17C 2201/0109* (2013.01); *F17C 2203/0604* (2013.01); *F17C 2203/0617* (2013.01); *F17C 2203/0646* (2013.01); *F17C 2203/0648* (2013.01); *F17C 2209/2181* (2013.01); *F17C 2209/222* (2013.01)

(58) Field of Classification Search
CPC ........ F17C 2209/2181; F17C 2209/222; F17C 2203/0617; F17C 2201/0109
See application file for complete search history.

(56) References Cited

FOREIGN PATENT DOCUMENTS

| CN | 201446947 U | 5/2010 |
|----|-------------|--------|
| CN | 101975272 A | 2/2011 |
| CN | 104271289 A | 1/2015 |
| JP | 0940476 A | 2/1997 |
| JP | 200790374 A | 4/2007 |
| RU | 2052533 C1 | 1/1996 |
| RU | 2183299 C2 | 6/2002 |
| RU | 2382919 C2 | 4/2009 |
| RU | 87492 U1 | 10/2009 |
| RU | 104875 U1 | 5/2011 |
| RU | 2429930 C1 | 9/2011 |
| RU | 2510784 C1 | 4/2014 |
| RU | 2576286 C2 | 11/2015 |
| WO | 2011115202 A1 | 9/2011 |

VESSEL MADE OF THERMALLY NON-HARDENABLE ALUMINUM ALLOY AND METHOD FOR THE PRODUCTION THEREOF

RELATIONSHIP TO OTHER APPLICATIONS AND INCORPORATION BY REFERENCE

This application is the national stage (Rule 371) of international application No. PCT/RU2018/050018 filed on 8 Feb. 2018.

This application claims priority to and the benefit of PCT/RU2018/050010 filed on 8 Feb. 2018, and EA 201700164, filed on 15 Feb. 2017. Both of these applications and any and all documents and publications cited herein are hereby incorporated by reference for all purposes.

FIELD OF THE INVENTION

The present invention relates to metalworking, in particular to producing vessels from non-heat-treatable aluminium alloys used for tanks and pressure vessels, and can be used in aerospace, gas, automotive, shipbuilding and other industries.

BACKGROUND OF THE INVENTION

RU 2510784 discloses a method of manufacturing welded pressure vessels out of steel, according to which a shell is made by rolling up a steel sheet blank with subsequent automatic welding with calibration and x-ray quality control of the weld. The bottom is manufactured separately by drawing. Then fittings and valves are welded into the shell and the bottom, and then the shell and the bottom are assembled and automatically welded with circular butt welds. The method is very time-consuming, and the cylinders have high production costs, as the method includes obtaining the shell and the bottom separately and subsequently welding them together. Furthermore, the use of steel as the material for manufacturing vessels imposes further difficulties on the process of vessel manufacturing. And if aluminium alloys are used, automatic fusion welding fails to ensure air tightness and strength of welds at parent metal level.

A method of manufacturing a vessel (liner) from an aluminium alloy is known from RU 2429930. The method includes localized heating of an extruded aluminium alloy tube and rolling the tube to form a bottom, a middle cylindrical part and a bottom with a neck. After forming the bottom, a conical hole is drilled at the polar point in its middle part, which is then welded with a filler wire to form an equally strong airtight solid bottom, and the outer welded part is cleaned out using low-angle surface cleaning-out. Further, the outer surface of the bottom is provided with an elliptical shape.

However, extruded tubes made of aluminium alloys have high wall thickness tolerances which leads to needing to select a tube with a thicker wall in order to ensure liner strength. Therefore, the method of RU 2429930 is characterized by higher metal consumption and payload ratio (figure of merit) defined as the ratio of vessel mass to the capacity thereof in liters (kg/L).

Further, extruded tubes made of aluminium alloys possess mechanical anisotropy: metal strength in the chordal (radial) direction is 15-20% lower compared to the longitudinal direction. As a result, in order to ensure the required properties, wall thickness of the tube has to be increased, leading to an additional increase in metal consumption and an increase in the payload ratio of the produced vessel (liner).

Further, a prior art vessel (pressure tank) made of a non-heat-treatable aluminium alloy is disclosed in RU 2382919. The tank comprises a one-piece metal shell formed of an extruded tube blank made of a non-heat-treatable aluminium-magnesium alloy, the strengthening of which is carried out by subjecting the tank to test pressure. The blank material for producing the non-heat-treatable aluminium-magnesium alloy vessel in the prior art document is a one-piece extruded tube made of aluminium-magnesium system alloys. However, the method of manufacturing disclosed in RU 2382919 has several drawbacks: it requires strengthening by repeatedly loading the tank with test pressure, thus significantly complicating and increasing the cost of the tank manufacturing process, and the use of a one-piece tube blank leads to an increase in mass and an increase in the payload ratio, as extruded tubes made of a non-heat-treatable alloys have high wall thickness tolerances. Furthermore, tubes produced using the prior art method possess mechanical anisotropy: metal strength in the chordal (radial) direction is 15-20% lower compared to the longitudinal direction. In view of such characteristics, it is necessary to select a tube with a thicker wall to achieve the required vessel strength, which leads to an increase in metal consumption of the structure and to a payload ratio increase.

The above drawbacks are partially addressed in a vessel manufacturing method disclosed in US 20140027023, which is considered to be the prior art solution for the present invention and includes: forming one or more metal plates into a tube with one pair of opposite edges facing one another to form a longitudinal joint line; friction stir welding the opposite edges together along the joint line; cold working (at a temperature of less than approximately 100° C.) at least a part of the friction stir welded region, and heat treating the tube at a temperature above the recrystallisation temperature. The prior art method overcomes many of the disadvantages associated with manufacturing vessels from a one-piece extruded aluminium tube: compared to the above methods, the method of US 20140027023 involves less metal and time consumption, and the resulting vessel (tank/liner) is expected to have a lower payload ratio. However, the method of US 20140027023 is preferable for manufacturing vessels of heat-treatable aluminium alloys, as in the case of non-heat-treatable aluminium alloys, cold working followed by heat treatment above the recrystallisation temperature leads to a decrease in strength and, as a result, reduces service life of vessels (tanks), increases their weight and payload ratio. Furthermore, cold working of heat-treatable aluminium alloys generally does not allow forming the required vessel shape "in one go", therefore it is preferable to perform the working and the heat treatment multiple times (see US 20140027023, p. 12), thus complicating and increasing the costs of the manufacturing process. Further, another drawback of the prior art method is evident during the heat treatment of the welded tube, namely excessive grain growth in the weld zone leading to deterioration of the mechanical properties of the material along the weld line. In order to minimize said effect, a (potentially multi-stage) tube drawing procedure is used, the procedure involving annealing of the tube between each stage. This additionally increases manufacturing time of the tank and leads to higher cost of manufacturing the final product.

Although preferred (according to US 20140027023) heat-treatable aluminium alloys are generally more durable than non-heat-treatable alloys, the manufacturing of vessels from the former is associated with additional heat treatment costs.

The costs of the hardening and age-hardening procedures should also be taken into account, as well as the costs of the required specialized equipment (hardening and age-hardening furnaces).

In view of the above, the use of non-heat-treatable alloys can significantly reduce general costs, and can further simplify the vessel manufacturing technology and lower the costs thereof.

Therefore, it is the object of the present invention to provide a relatively simple and inexpensive method of manufacturing a vessel from a non-heat-treatable aluminium alloy, the method allowing to produce a durable and wear-resistant vessel with low weight and low payload ratio.

SUMMARY OF THE INVENTION

According to one aspect of the present invention, there is provided a method of manufacturing a vessel, the method including: forming a tube by rolling at least one flat blank and abutting the edges thereof, friction stir welding the abutted edges and working at least a part of the tube into a shape of the vessel, wherein the flat blank is a sheet of a non-heat-treatable aluminium alloy preliminarily subjected to cold working with permanent deformation within the range of 0.5-15%, and said working of at least one part of the tube is hot working at a temperature of 230-520° C. The disclosed method provides a technical effect of reduced vessel weight, increased vessel strength, uniform vessel strength and reduced number of hot working cycles during manufacturing of the vessel. Further, the method provides reduced metal and time consumption in manufacturing a vessel from a non-heat-treatable aluminium alloy, low payload ratio, increased reliability and longer service life of the vessel produced using the method.

The stated technical effect is achieved due to the fact that the method includes forming a tube by rolling at least one flat blank and abutting the edges thereof, friction stir welding the abutted edges and working at least a part of the tube into a shape of the vessel, wherein the flat blank is a sheet of a non-heat-treatable aluminium alloy preliminarily subjected to cold working with permanent deformation within the range of 0.5-15%, and said working of at least one part of the tube is hot working at a temperature of 230-520° C.

According to an embodiment of the invention, the non-heat-treatable aluminium alloy is an alloy based on Al—Mn, Al—Mg or Al—Mg—Mn systems. According to another embodiment, the at least one flat blank in the form of a sheet of a non-heat-treatable aluminium alloy is preliminarily subjected to cold stretching.

According to yet another embodiment of the present invention, the at least one flat blank in the form of a sheet of a non-heat-treatable aluminium alloy is preliminarily subjected to cold rolling.

According to an embodiment of the invention, the hot working at a temperature of 230-520° C. is carried out by unrolling, rolling, pressing, stamping or rotary drawing.

According to another embodiment of the invention, the hot working of the tube is carried out simultaneously from two ends of the tube.

According to an embodiment of the present method, the tube is calibrated after welding in order to obtain the required dimensional accuracy.

According to an embodiment of the invention, weld cleaning-out and/or grinding is performed after welding.

According to another aspect of the invention, there is provided a vessel comprising a cylindrical portion in the form of a welded tube and two bottoms, wherein the vessel is produced according to the present method. According to various embodiments of this aspect of the invention, the vessel comprises a smooth bottom and a bottom with a neck, or the vessel comprises two bottoms with necks.

According to an embodiment of this aspect of the invention, the vessel has a bottom wall thickness of at least 1.5× of wall thicknesses in the cylindrical portion. Such measures are aimed at providing a thickened section for mounting a fitting, a plug or other necessary devices into the neck or the bottom of the vessel.

BRIEF DESCRIPTION OF THE DRAWINGS

Features and the preferred embodiment of the present invention are described with reference to the accompanying figures. It should be understood that the preferred embodiment is used only as a non-limiting example, and all variations of the proposed aspects of the present invention, which are apparent to those skilled in the art, are included in the scope of protection defined in the following claims.

DETAILED DESCRIPTION OF THE INVENTION

In the present description, the term "vessel" is understood to be the most general term applicable to an article (device) having an internal cavity. Moreover, the present invention in particular cases can be applied to manufacturing of tanks or liners for tanks operating under pressure.

The mentions of particular devices, technologies, and applications given in the present description are merely exemplary. Modifications to the embodiments disclosed in the present description are obvious to those skilled in the art, and the general principles defined in the description below can be used in the context of other embodiments and applications without departing from the essence and scope of the present invention.

It should be noted that during cold working of non-heat-treatable alloys with a degree of permanent deformation of under 0.5%, sufficient hardening does not occur, and during working with a degree of more than 15% there is a significant decrease in ductility, which complicates the process of forming a tube from a flat blank. Moreover, the strength and ductility of the weld obtained by friction stir welding of non-heat-treatable aluminium alloys is equal to or slightly higher than the strength and ductility of the parent material. As a result, the welded tube blank thus obtained has uniform strength in contrast to the welded blank made of heat-treatable aluminium alloys.

In turn, identical properties of the initial blank and the weld allow for obtaining the required vessel shape over one cycle of hot working of the welded tube at temperatures of 230-520° C. Moreover, the parent material and the weld joint possess identical hot workability, thus providing the possibility of obtaining a uniformly strong vessel with high strength and ductility.

During working on a non-heat-treatable aluminium alloy, e.g. based on the Al—Mn, Al—Mg, or Al—Mg—Mn system, sufficient ductility of the material is required, and after working it is necessary to obtain an unrecrystallised structure and a uniform distribution across phase cross-sections between aluminium and magnesium, and aluminium and manganese. It should be noted that hot working in the temperature range of 230-520° C. provides sufficient ductility of a non-heat-treatable aluminium alloy to obtain the desired shape and allows to avoid a decrease in strength due to dynamic recrystallisation. Moreover, at temperatures below 230° C., the workability of such an alloy sharply decreases, and at temperatures above 520° C., a process of dynamic recrystallisation occurs, reducing material strength.

The main features and aspects of the present invention will be further explained in non-limiting illustrative examples of a liner for pressure tanks made of a non-heat-treatable aluminium alloy. In this case, the liner for tanks is a specific example of a vessel according to the invention.

Figure 1:
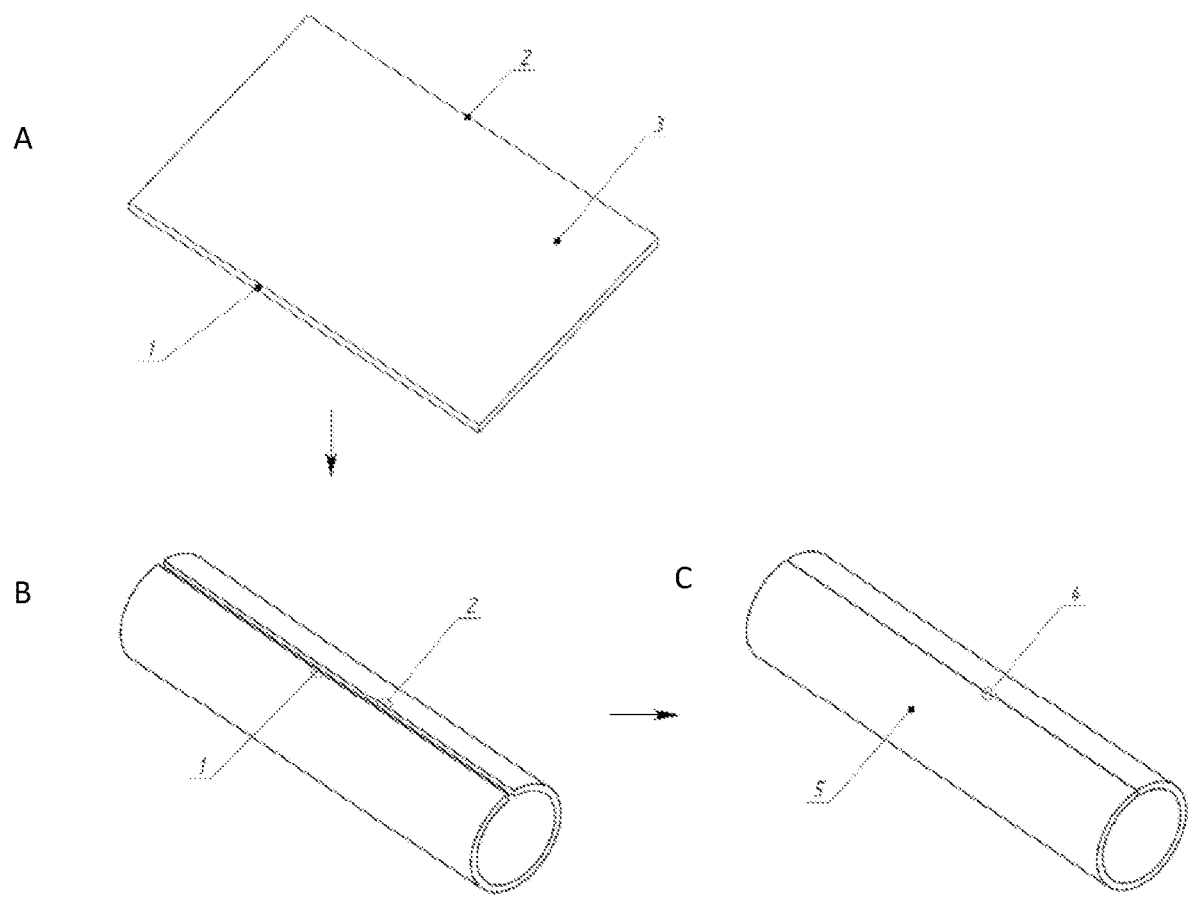
FIG. 1. Steps of manufacturing a cylindrical blank for a liner according to an embodiment of the present invention.

According to this embodiment of the present invention, a flat blank 3 in the form of a sheet with thickness of 5 mm made of a non-heat-treatable aluminium alloy 1561, previously cold rolled with a degree of 15% is used as the initial material for manufacturing a liner. The flat blank 3 is shown in FIG. 1A, where 1 and 2 are the edges of the blank to be welded together. A tube is formed from the flat blank of a non-heat-treatable aluminium alloy by rolling and abutting the edges (1 and 2) along the length of the blank (FIG. 1B).

After that, friction stir welding is carried out along the length of the abutted edges 1 and 2 (along line 4). The result is a cylindrical blank 5 in the form of a welded tube shown in FIG. 1C. Upon completion of the welding process, according to this embodiment of the present invention, the weld is machined if necessary, followed by optional calibration of the cylindrical blank (welded tube) in order to obtain the appropriate dimensions with required accuracy. In various embodiments of the present invention, the machining is cleaning out and/or grinding the weld from one or both sides, and the machining further includes, e.g. sand blasting or shot blasting.

At the following step, according to this embodiment of the invention, hot working of the cylindrical blank 5 is carried out by unrolling, rolling, pressing, stamping or rotary drawing from two ends of the blank 5 thus forming a liner using specialized equipment with heating of the workable parts of the blank to a temperature of 230° C. As explained above, due to the use of a flat blank as a starting material that underwent preliminary cold working with a degree in the range of 0.5-15%, and also due to the use of friction stir welding in the previous step, the obtained cylindrical blank 5 is uniformly strong, and the hot working of the welded cylindrical blank 5 allows for a relatively quick (over one cycle) formation of the required liner shape. The liner of a non-heat-treatable aluminium alloy thus obtained has a longitudinal weld made by friction stir welding, which was subjected to hot working on at least a portion of its length. Therefore, the liner is characterized by uniform high strength, low weight and high capacity (low payload ratio).

Despite the fact that the above embodiment utilizes the non-heat-treatable aluminium alloy 1561 of the Al—Mg—Mn system, one skilled in the art will recognize that all principal features and advantages of the present invention can be implemented with non-heat-treatable aluminium alloys based on the Al—Mn or Al—Mg systems, or based on other suitable systems. It should also be noted that the welded cylindrical blank 5 can be subjected to hot working at any portion(s) or at all portions thereof depending on the desired shape of the vessel being manufactured.

Preliminary cold working of the initial flat blank in various embodiments is carried out by stretching, rolling or other methods known in the art.

Figure 2:
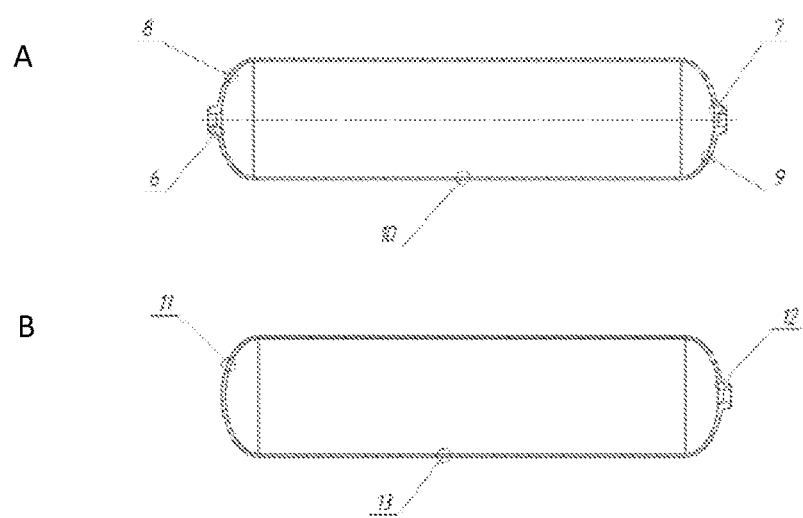
FIG. 2. The step of manufacturing a liner from a cylindrical blank according to an embodiment of the present invention.

The shape given to the blank 5 at the hot working step can also vary; e.g. it can be a shape with two necks 6 and 7 (FIG. 2A) or with a smooth bottom 11 at one end of the blank and a neck 12 at the other end (FIG. 2B). Depending on the operational requirements for the final product, the steps of the method can also provide different wall thicknesses of the liner at various parts thereof. For instance, when forming a liner requiring subsequent installation of a fitting or other additional equipment, a significant bottom wall thickness is specifically provided in order to allow for reliable affixing of such devices without compromising vessel strength. According to an embodiment, liner wall thickness (FIG. 2) in the bottom 8, 9 is at least 1.5× of the wall thickness in the cylindrical part 10 of the liner. According to another embodiment, wall thickness of the liner in the bottom 11, 12 is at least 1.5× of the wall thickness in the cylindrical part 13.

The hot working step can be time-optimized; e.g. according to an embodiment of the invention, hot working is carried out simultaneously on both sides of the blank 5.

The parts of the cylindrical blank (welded tube) being subjected to hot working can be heated using any known method. If necessary, lubricant is applied to the workable parts of the cylindrical blank (welded tube) prior to hot working.

Examples

Liners (vessels) were manufactured using the present method, the liners having the following dimensions: a diameter of 470 mm, a length of 2650 mm.

In order to assess weight characteristics of the liner, the payload ratio was determined as the ratio of liner mass to hydraulic volume thereof (L). Hydraulic burst tests of the liners (vessels) were conducted and pressure at which the liners burst was determined; structural figures of merit (FOMS) of the liners (vessels) were determined as the ratio of the product of burst pressure and hydraulic volume of the liner to its mass. The lower the payload ratio, the greater the efficiency and economy of the liner. The higher the burst pressure, the higher the service life and reliability of the vessel (liner). The higher the structural figure of merit of the liner, the greater the potential energy of each kilogram of vessel mass and the higher its specific tensile strength.

The following methodology was used for conducting the hydraulic tests of the liner (vessel):

1. Hydraulic tests were carried out using water at a temperature in the range of +5° C. to +40° C.

2. The pressure in the hydraulic line of the test bench was controlled by two pressure gauges (GOST 2405-88) with an accuracy class of at least 1.0.

3. The following testing sequence was utilized:

3.1. The liner was placed in a chamber for conducting hydraulic tests.

3.2. A fitting and a plug were installed on the liner.

3.3. The fitting was connected to the hydraulic line of the test bench.

3.4. The liner was filled with water, followed by removal of residual air from the liner.

3.5. Required test pressure was established in the hydraulic line. Pressure rise rate in the hydraulic line did not exceed 5 Mpa/min. When the estimated burst pressure (100 atm.) is reached, it is necessary to stop the loading of the liner for 5 to 8 s, and then resume the loading of the liner until it bursts.

3.6. The burst pressure value, the location and the nature of the burst were recorded. The burst should be non-splintering and should occur along the cylindrical part of the vessel (liner). Liners according to the present method were manufactured from sheets of alloy 1561 of the Al—Mg—

Mn system (with the following content of the main alloying elements: Mg—5.9%, Mn—0.8%).

For the purposes of comparative analysis, three exemplary liners according to the present invention were made.

In Example 1, a 7 mm thick sheet of alloy 1561 was used, which underwent preliminary cold stretching with a degree of 0.6%. The rolling of the sheet into a tube was carried out on a three-roll bending machine, followed by friction stir welding of the tube along the length of the abutted edges. Hot working on the welded tube (thus forming the liner) was carried out on specialized equipment, with workable parts of the blank heated to a temperature of 520° C.

In Example 2, a 6 mm thick sheet of alloy 1561 was used, which underwent preliminary cold stretching with a degree of 4%. The tube manufacturing method (rolling and welding) was similar to that described in Example 1. Hot working on the welded tube (thus forming the liner) was carried out on specialized equipment, with workable parts of the blank heated to a temperature of 300° C.

In Example 3, a 5 mm thick sheet of alloy 1561 was used, which underwent preliminary cold rolling with a degree of 15%. The tube manufacturing method (rolling and welding) was similar to that described in Example 1. Hot working on the welded tube (thus forming the liner) was carried out on specialized equipment, with workable parts of the blank heated to a temperature of 230° C.

Furthermore, the following articles were manufactured for comparison:
- a liner from a whole extruded tube produced according to the method of RU 2382919 from alloy 1561. Tube diameter was 470 mm, wall thickness was 10 mm;
- a liner according to US 20140027023. For the above purposes, an 8 mm thick sheet of alloy 1561 was used. Rolling and friction stir welding were performed to obtain a welded tube. The liner was formed by cold working in two stages with intermediate annealing at a temperature of 410° C. with holding time of 30 minutes. The final heat treatment was carried out at a temperature of 440° C., which is higher than the recrystallisation temperature.

The results of measurements and tests are displayed in Table 1. As seen in Table 1, the present method provides liners (vessels) with a 12-35% lower payload ratio compared to the prior art, with structural figures of merit (FOMS) for the liner (vessel) 1.5-2 times greater than those for the prior art, and liner (vessel) burst pressure values 24-27% greater than those for the prior art.

This allows for a reduction in liner weight of 20-25% on average, and further extends service life and operational reliability of devices manufactured according to the present method.

TABLE 1

Comparative properties of prior art devices and the device of the present invention

| Manufacturing method | Wall thickness $h_{CT}$, mm. | Hydraulic volume, V, liters | Vessel mass, M, kg | Payload ratio, K, kg/L | FOMS, kJ/kg | Burst pressure, atm (MPa) |
|---|---|---|---|---|---|---|
| Liner according to RU 2382919 | 10 | 400 | 110 | 0.275 | 49 | 138 (13.5) |
| Liner according to US 20140027023 | 8 | 405 | 87 | 0.215 | 51 | 112 (11.0) |
| Liner of the invention: | | | | | | |
| Example 1 | 7 | 410 | 78 | 0.190 | 80 | 115 (15.2) |
| Example 2 | 6 | 414 | 68 | 0.164 | 89 | 149 (14.6) |
| Example 3 | 5 | 417 | 58 | 0.139 | 107 | 152 (14.9) |

All numerical values and examples disclosed in the present description relate to particular embodiments of the present invention. One skilled in the art will appreciate that various numerical values are feasible upon varying various parameters and conditions. However, in general, the indicators of strength, metal consumption, time consumption, ultimate pressure, and other indicators not listed here, characterizing the method and device according to the claims of the present invention and due to the innovative features thereof, indicate a clear advantage provided by the invention in comparison with prior art methods and devices.

The invention claimed is:

1. A method of manufacturing a vessel, the method including:
   a) forming a tube by rolling at least one flat blank and abutting the edges thereof, wherein the at least one flat blank is a plate of a non-heat-treatable aluminium alloy preliminarily subjected to cold working with permanent deformation within the range of 0.5-15%,
   b) friction stir welding the abutted edges, and
   c) hot working at least a part of the welded tube into a shape of the vessel at a temperature of 230-520° C. over one cycle.

2. The method according to claim 1, wherein the non-heat-treatable aluminium alloy is an alloy based on Al—Mn, Al—Mg or Al—Mg—Mn systems.

3. The method according to claim 1 wherein the at least one flat blank in the form of a plate of a non-heat-treatable aluminium alloy is preliminarily subjected to cold working by drawing.

4. The method according to claim 1 wherein the at least one flat blank in the form of a plate of a non-heat-treatable aluminium alloy is preliminarily subjected to cold working by rolling.

5. The method according to claim 1 wherein the hot working at a temperature of 230-520° C. is carried out by unrolling, rolling, pressing, stamping or rotary drawing.

6. The method according to claim 1 wherein the hot working of the welded tube is carried out simultaneously from two ends of the tube.

7. The method according to claim 1 wherein the welded tube is calibrated after welding.

8. The method according to claim 1 wherein weld cleaning-out and/or grinding is performed after welding.

9. A vessel manufactured according to the method of claim 1.

10. The vessel according to claim 9, wherein the vessel comprises a smooth bottom and a bottom with a neck.

11. The vessel according to claim 9 vessel comprising two bottoms with a neck.

12. The vessel according to claim 9 wherein the vessel has a bottom wall thickness of at least 1.5× of wall thicknesses in the cylindrical portion.

\* \* \* \* \*